US012483859B2

(12) United States Patent
Riley

(10) Patent No.: US 12,483,859 B2
(45) Date of Patent: Nov. 25, 2025

(54) SYSTEMS AND METHODS FOR DETECTING THE LOCATION OF OBJECTS USING A NETWORK OF INTERNET OF THINGS (IOT) DEVICES

(71) Applicant: Cognosos, Inc., Atlanta, GA (US)

(72) Inventor: Peyton Riley, Atlanta, GA (US)

(73) Assignee: Cognosos, Inc., Atlanta, GA (US)

( * ) Notice: Subject to any disclaimer, the term of this patent is extended or adjusted under 35 U.S.C. 154(b) by 383 days.

(21) Appl. No.: 17/822,386

(22) Filed: Aug. 25, 2022

(65) Prior Publication Data

US 2023/0067617 A1 Mar. 2, 2023

Related U.S. Application Data

(60) Provisional application No. 63/237,026, filed on Aug. 25, 2021.

(51) Int. Cl.
*H04W 4/029* (2018.01)
*H04W 4/44* (2018.01)
*H04W 4/46* (2018.01)

(52) U.S. Cl.
CPC ............ *H04W 4/029* (2018.02); *H04W 4/44* (2018.02); *H04W 4/46* (2018.02)

(58) Field of Classification Search
CPC .......... H04W 4/029; H04W 4/44; H04W 4/46
See application file for complete search history.

(56) References Cited

U.S. PATENT DOCUMENTS

| 2017/0006418 A1* | 1/2017 | Mayor ................. H04W 4/90 |
| 2020/0249695 A1* | 8/2020 | Otto ................... G05D 1/0274 |
| 2021/0311208 A1* | 10/2021 | Ohlarik .............. G01S 19/396 |
| 2022/0083921 A1* | 3/2022 | Brkic ................ G06Q 30/0241 |

FOREIGN PATENT DOCUMENTS

| WO | WO-9963358 A1 * | 12/1999 | .......... G01S 19/04 |
| WO | WO-2015118530 A1 * | 8/2015 | ......... B60R 25/1025 |

* cited by examiner

Primary Examiner — Marisol Figueroa
(74) Attorney, Agent, or Firm — Foley Hoag LLP; John D. Lanza; Emily H. Yasharpour

(57) ABSTRACT

Systems and methods are disclosed for detecting the location of objects using a network of internet of things (IoT) sensors ("tracking devices"). The tracking devices may be capable of determining location information (for example, through GPS signals) and may communicate this information to a central server. However, in some cases, a tracking device may be unable to communicate with the central server using a long-range communication network. The tracking device may also be unable to ascertain its own location. In such situations, other tracking devices may communicate with the tracking device over short-range signals, determine the location of the tracking device, and relay this information to the central server.

18 Claims, 4 Drawing Sheets

SYSTEMS AND METHODS FOR DETECTING THE LOCATION OF OBJECTS USING A NETWORK OF INTERNET OF THINGS (IOT) DEVICES

CROSS-REFERENCE TO RELATED APPLICATIONS

This application claims the benefit of U.S. Provisional Application 63/237,026, filed on Aug. 25, 2021; the contents of which are hereby incorporated by reference in its entirety.

BACKGROUND

Fixed-location asset tracking in various indoor/outdoor environments may be associated with infrastructure limitations. For instance, it may be desirable to track vehicles and other objects in places where GPS signals may not be present and where it may be impractical to install additional traditional infrastructure.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure generally relates to, among other things, systems and methods for detecting the location of objects using a network of Internet of Things (IoT) devices (also referred to as "tracking devices" or "devices" herein). In some embodiments, the systems and methods may more particularly relate to tracking the location of multiple tracking devices that together form a "mesh network" using a combination of long-range signals and short-range signals. For example, the long-range signals may include signals such as Global Positioning System (GPS) signals or any other type of long-range signal. The short-range signals may include Bluetooth, Wi-Fi, ultra wideband (UWB), Zigbee, near field communication (NFC), and/or any other type of short-range signal. By using the combination of long-range and short-range signals, the location of a device may continue to be tracked by other tracking devices in the mesh network (for example, using received signal strength indicator (RSSI) and other signal strength indictors to ascertain a tracking device's location relative to another tracking device), even if the device enters a location in which it is not able to be tracked using long-range signals, such as GPS.

The systems and methods provide the further benefit of allowing location information to be shared by a tracking device even if it is unable to communicate over a long-range wireless communication network. For example, under normal operation the tracking devices may communicate their ascertained location information (and other information) to a central server over a long-range communication network, such as a LoRaWAN network or any other type of long-range communication network. However, if a first tracking device is unable to communicate over the network for any reason, then the information may be communicated to a second tracking device proximate to the first tracking device (or determined by the second tracking device as mentioned above). The second tracking device may then relay this information to the central server over the long-range communication network.

Figure 2:
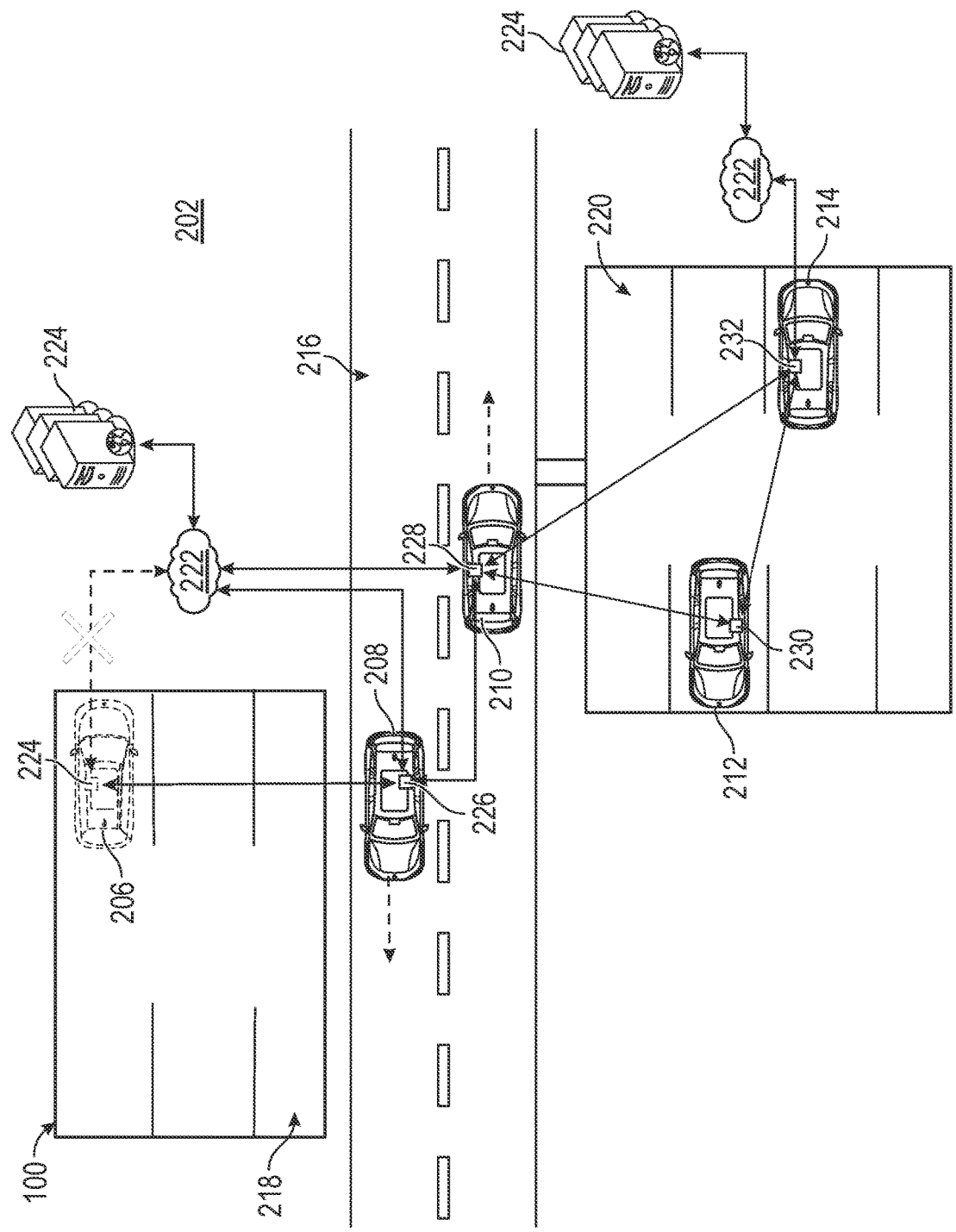
FIG. 2 depicts an example use case, in accordance with one or more example embodiments of the disclosure.

In a specific use case, these tracking devices may be associated with a network of vehicles and may be used to track the location of each of the vehicles in real-time. The combination of long-range signals and short-range signals may allow for the vehicles in the network to be tracked even if some of the vehicles are temporarily or permanently unable to communicate with a central system (for example, a central server) over the long-range communication network. That is, the devices in the network may communicate with neighboring devices using the short-range signals, which may still be possible even if a vehicle is unable to communicate using the long-range communication network. This information may then be interspersed throughout the mesh network, and may also be provided to the central system over the long-range communication network by any of the other devices as well. For example, a vehicle that is located indoors and is unable to communicate using the long-range communication network may communicate with another vehicle that is located outdoors using short-range signals, and then that vehicle that is located outdoors may relay this information using the long-range communication network. In this regard, a vehicle that is normally able to be tracked using GPS may still be tracked by communicating with other nearby vehicles that are still able to communicate over the long-range communication network. A further illustration of this use case is shown in FIG. 2. Additionally, while reference is made herein to the tracking devices used to track vehicles, this is not intended to be limiting. The tracking devices may also be used to track any other object as well.

The systems and methods described herein may provide a number of benefits. For example, the network of devices may be a mesh network, may be fully battery-powered (so they may not necessarily rely on external power sources), and may be able to remain synchronized even though timing requirements for data sharing may be extremely tight (for example, synchronized to share data in time increments as small as seconds or milliseconds within a given day). This may allow an ultra-lightweight neighbor-network to be formed ad-hoc, with little impact on a tracking device's battery. The systems described herein may also be large scale in that most target use cases may include tens of thousands of battery-powered sensors communicating in close proximity. The systems may also be mobile and adaptable in that the nodes (for example, vehicles) including such devices may move and the network may adjust itself at the next scheduled synchronization time. Furthermore, the systems may provide its own infrastructure in that as long as any one device in the neighbor network has location context, the location of any other device in the neighbor network may be derived as well.

Turning to the tracking devices themselves, in some embodiments, the devices may be battery-powered. The devices may also be portable devices that may be configured to interface with a vehicle system. For example, the devices may be capable of being inserted into vehicle's on-board diagnostics (OBD) port. Given this, while the devices may be fully battery powered and may not necessarily need to rely on an external power source, the devices may still be capable of drawing power from an external power source, such as through the OBD port of the vehicle. This may be beneficial because it may extend the lifetime of the battery.

Additionally, the devices may be able to capture data relating to a vehicle, such as a vehicle identification number (VIN), a current speed of the vehicle, a heading of the vehicle, a battery level of the vehicle, or any other types of information. This information may be transmitted to other devices in the mesh network (and/or to a central system), as may be described below.

The devices as a collective may form a mesh network, and all of the devices included in this mesh network may be precisely time-synchronized using GPS time synchronization. The precise time synchronization may allow each device to "wake up" at one or more pre-scheduled times throughout a given day, broadcast a signal announcing its presence (and providing other information as described in further detail below), and briefly search for other nearby transmissions from other devices in the mesh network. These transmissions may be performed using short-range signals (such through Bluetooth communications as described above). During this brief time, some or all of the devices may learn information about neighboring devices, including signal characteristics of the neighboring devices, such as RSSI, etc. This information that is obtained through short-range signals may then be broadcasted over a primary (longer-range) network, such as a LoRaWAN network, or any other type of long-range wireless or wired network. Once the wake-up period is completed, the devices may then go back to sleep and preserve battery life until the next predetermined wake-up period.

In some embodiments, information obtained from one or more devices in the mesh network may be compiled and presented to a user through a user interface. For example, a topology including the location of some or all of the devices in the network may be mapped and presented to the user to allow the user to track the location of the devices in real-time. Additional information may also be presented to the user, such as identifying information associated with each of the devices, whether a device is trackable using GPS, information about a vehicle associated with a device (in the example use-case in which the devices are associated with vehicles) or any other types of information. A user may also be able to interact with the information presented on the user interface, For example, the devices may be represented as dots (or other symbols) on a map presented on the user interface, and a user may select a particular dot on the user interface to view additional information about the device being represented by the particular dot (an example may be illustrated in FIG. 1). This is just one non-limiting example of a user interface that may be presented to a user, and information about the devices may similarly be presented in any other manner. The user interface may be provided on a mobile device of a user, a desktop, a laptop, or any other type of device.

In some embodiments, tracking the location of a device in areas where tracking using GPS (or other long-range signals) may not be possible may be performed as follows. At a first time, when the device is located outdoors and is able to be tracked using GPS (or another long-range signal), the location of the device may be determined and provided to other devices and/or the central system. At a second time, it may be determined that the location of the vehicle is no longer ascertainable (for example, GPS signals may no longer be transmitted and/or received to and/or from the device), or may fall below a certain quality threshold. This may provide an indication that the device has transitioned into an indoor location and is no longer able to transmit and/or receive GPS signals (or other long-range signals). In such a case, the location of the device at the second time may be inferred given the range limitations of a short-range communication protocol such as Bluetooth. For example, if the device was last tracked at location 'A' using GPS at a first time, if the range limitation of Bluetooth is 50 meters (as an example), and it is determined that a second device (or other device capable of Bluetooth communications) is able to communicate with the first device at the second time using Bluetooth communications, then it may be inferred that the device is likely at a location that is within 50 meters of location A at the second time.

In some embodiments, although short-range signals may be utilized to locate a device that may be temporarily or permanently unable to perform location tracking using long-range signals (for example, if a vehicle is located indoors), devices may always be attempting to perform the location tracking using both short-range and long-range signals. That is, the devices may not necessarily only be attempting to perform tracking using long-range signals, and then switch to short-range signals when it is determined that a device is no longer able to communicate using long-range signals. Instead, tracking using both short-range and long-range signals may always be attempted, and the system may determine whether to use a long-range transmission or a short-range transmission from a given device for tracking purposes. For example, if possible, long-range signal transmissions may be a primary type of signal used for tracking a device because such signals may be associated with greater accuracy than a short-range signal (for example, GPS tracking may afford greater accuracy than tracking using Bluetooth). However, when it is determined that a long-range signal is providing insufficient tracking information, then the short-range signal transmissions may then be relied upon to track the device. For example, if the device moves from an outdoor location to an indoor location, and a GPS signal becomes insufficient, then Bluetooth signals received from the device may instead be used to track the device while it is indoors.

In some embodiments, it may be determined that a GPS signal is insufficient if an accuracy of the GPS signal fails to meet a threshold level of accuracy. This threshold level of accuracy, for example, may be determined by determining a number of satellites that are able to lock onto the location of the device. If less than a threshold number of satellites are able to lock on to the location of the device, then it may be determined that the GPS signal is insufficient, and the short-range signals may instead be used for tracking purposes. The determination that the long-range signal is provided inaccurate location information may also be made using any other suitable methods as well.

In some cases, the determination as to whether a GPS signal is insufficient may be a determination that is made by the device that is being located using the GPS signal itself. That is, a device may determine that its GPS signal is insufficient, and may provide an indication of such to other devices in the network, including a central system as described herein. However, in other cases, other devices in the network and/or the central system may receive signals from different devices in the network and may make the determination based on the signals. As mentioned herein, devices in the network may send GPS and Bluetooth information in transmissions to other devices in the network and/or a central system, and the other devices in the network and/or the central system may simply choose at least one of the GPS and/or the Bluetooth information to determine relative locations of the devices in the network. For example, if the central system receives GPS information and Bluetooth information from a first device in the network, and also receives an indication that the GPS information is insufficient, then the central system may instead rely on the Bluetooth information. In some cases, only one of the GPS information or the Bluetooth signals may be sent as well. For example, if a device determines that the GPS signal is sufficient, it may only send the GPS signal information to other devices and/or the central system.

In some embodiments, as mentioned above, when using short-range signals such as Bluetooth for tracking purposes, a location of a device may be approximated using the inherent range limitations of the particular type of short-range signal that is used. For example, if the range of typical Bluetooth signals is 50 meters (as a non-limiting example), then the location of the device may be approximated within 50 meters of its last-confirmed location. Additionally, further accuracy may be provided to tracking using the short-range signals by measuring a signal strength of the signals received from the device. For example, a second device in the network may determine a received signal strength indicator (RSSI) of any signals transmitted from the first device that is located indoors. The second device may be able to determine a relative location of the first device using the RSSI. For example, a higher RSSI may be indicative that the second device is closer to the first device than if the RSSI were lower. Furthermore, multiple devices may be leveraged in the network of devices to further increase the accuracy in tracking the first device. For example, trilateration between multiple devices may be used. That is, the second device may determine RSSI information associated with signals received from the first device, and a third device may also determine RSSI information associated with its own communications with the first device. If the location of the second device and the location of the third device are both known (for example, if both are ascertainable using GPS), and the relative RSSI values between the first device and second device and first device and third device are known as well, then this additional information may provide additional insight into the location of the first device relative to the second and third devices.

In some embodiments, even further accuracy may be afforded by implementing localization techniques in the first device. That is, the first device may be capable of performing localization using any number of techniques, such as dead reckoning, for example, the first device may also provide this information to the second device and/or the third device in the network. This localization information may be used in combination with any other information, such as RSSI information, to further enhance the accuracy of the location tracking for the first device. Regardless of the methods used to determine the location of the first device, any information that is received from the first device through short-range signals (for example, Bluetooth) may be transmitted to other devices in the network through short and/or long-range communications (for example, LoRaWAN or any other protocol). In this regard, a network of devices may be able to receive real-time information about other neighboring devices in the network even if some of the devices are unable to transmit long-range signals and are unable to be tracked using GPS.

Additionally, in some cases, the systems and methods described herein may implement artificial intelligence, machine learning, or other intelligence systems for any of the determinations described herein. For example, a machine learning system may be trained to determine the location of a device that is only able to communicate using short-range signals. As another example, the machine learning system may also be trained to determine when a GPS (or other long-range signal) is insufficient, and a short-range signal may need to be relied upon to track a particular device. Such an intelligent system may also be further trained using real-time data, such that the model used by the system may be improved over time.

In some embodiments, information may be shared between devices in the network (and/or the central system) periodically at predetermined points in time. For example, some or all of the devices may be configured to "wake-up" at the same predetermined time, share information, and then go back to sleep once the predetermined period of time has ended. "Waking-up" a device may refer to powering on the device such that the device is then able to transmit and/or receive data. A device that is sleeping may be a device that is either powered off, or only being provided below a threshold amount of power. By only waking-up the devices in the network for a short, predetermined period of time, the power consumption of the devices may be limited, and the bandwidth requirement for the network may be reduced.

In some embodiments, in order for precise, real-time tracking of all of the devices in the network to be performed given these short time periods during which the devices are transmitting and/or receiving information, the devices must be highly synchronized in terms of the timing at which they wake-up. This level of accuracy in time synchronization may be provided by using GPS time synchronization for the devices. In some cases, this synchronization information may be managed by the central system. For example, if the long-range signals used in the network are LoRaWAN signals, then a LoRaWAN gateway may be responsible for providing time synchronization information to the devices in the network. Using the central system rather than relying on individual devices to perform their own synchronization may be beneficial because the LoRaWAN gateway may be positioned such that it always receives GPS information, and so the potential for a device to lose synchronization by moving indoors may be mitigated. This synchronization information may be transmitted by the LoRaWAN gateway to devices that are currently capable of transmitting and/or receiving long-range signals (for example, devices located outdoors), and these devices may then transmit this synchronization information to the devices that are unable to transmit and/or receive long-range signals by providing this information using short-range signals. This above example, however, is not intended to be limiting, and the synchronization may be performed in any other suitable manner as well. For example, individual devices may, in fact, be responsible for their own synchronization. That is, a single device may perform its own GPS synchronization, and then when the device is unable to receive GPS signals, it may request time synchronization data from another device, or may simply continue relying on an internal clock based on the prior GPS time synchronization information from when the device was able to receive long-range signals.

In some embodiments, the devices in the network may also be configured to transmit and/or listen for transmitted packets from other devices in specific cycles during the wake-up period. For example, if a given wake-up period comprises a 10 second time interval, then a device may be configured to transmit packets for one second, listen to packets for another second, transmit additional packets for the next second, and so on. Additionally, the transmit and/or listen cycles may asynchronous to mitigate the occurrence of packet collisions (however, the cycles may also be synchronous as well). That is, some of the devices may be configured to transmit during a first second of the wake-up period, and some of the devices may be configured to listen for transmitted packets during the same first second of the wake-up period.

In some embodiments, upon waking-up, the devices may transmit various types of information to other devices in the network. For example, a device may transmit its media access control (MAC) address and other identifying information associated with the device (for example, if the device is associated with a vehicle, a vehicle identification number (VIN) may be included in the packet. Another example of types of data that may be transmitted may include status information associated with the vehicle. For example, a current temperature of the vehicle, a remaining battery life of the vehicle, or any other information about the vehicle may be included in the transmission. The transmission may also include any localization information determined by the vehicle (for example, if the vehicle performs localization using techniques such as dead reckoning as described above). The transmissions may also include data captured by the vehicle while it is located indoors, such as images and/or videos captured by one or more camera of the vehicle, or any other types of information obtained by the vehicle. Additionally, as aforementioned, a device receiving this information may be able to determine additional information that may not be explicitly included in the packet being transmitted. For example, a receiving device may be able to determine a RSSI of a signal received from the device. Additionally, if the receiving device receives multiple transmissions from the transmitting device, then the receiving device may use any number of different approaches to determine which RSSI to use as the RSSI associated with the transmitting device. For example, the receiving device may use an average RSSI of the received transmissions, may use a strongest RSSI, a weakest RSSI, or may use any other suitable approach as well.

In some embodiments, as described above, some or all of the information that is being shared amongst devices using the short-range communication protocol (for example, Bluetooth) may be complied into packets to be transmitted over long-range communication protocols (for example, LoRaWAN). Additionally, information received from multiple devices may be included in the same LoRaWAN payload to increase the efficiency of the long-range communications. For example, instead of transmitting a LoRaWAN packet at every instance of receiving information from a single device over short-range communications, which would result in a large number of packets being transmitted, the LoRaWAN packet may be filled with information from multiple devices before being transmitted. In some cases, the LoRaWAN packet may be filled until a maximum payload size is reached. However, the cut-off for determining when to stop adding information to a given LoRaWAN packet may involve other criteria as well, such as a time threshold, or any other type of cutoff criteria.

Figure 1:
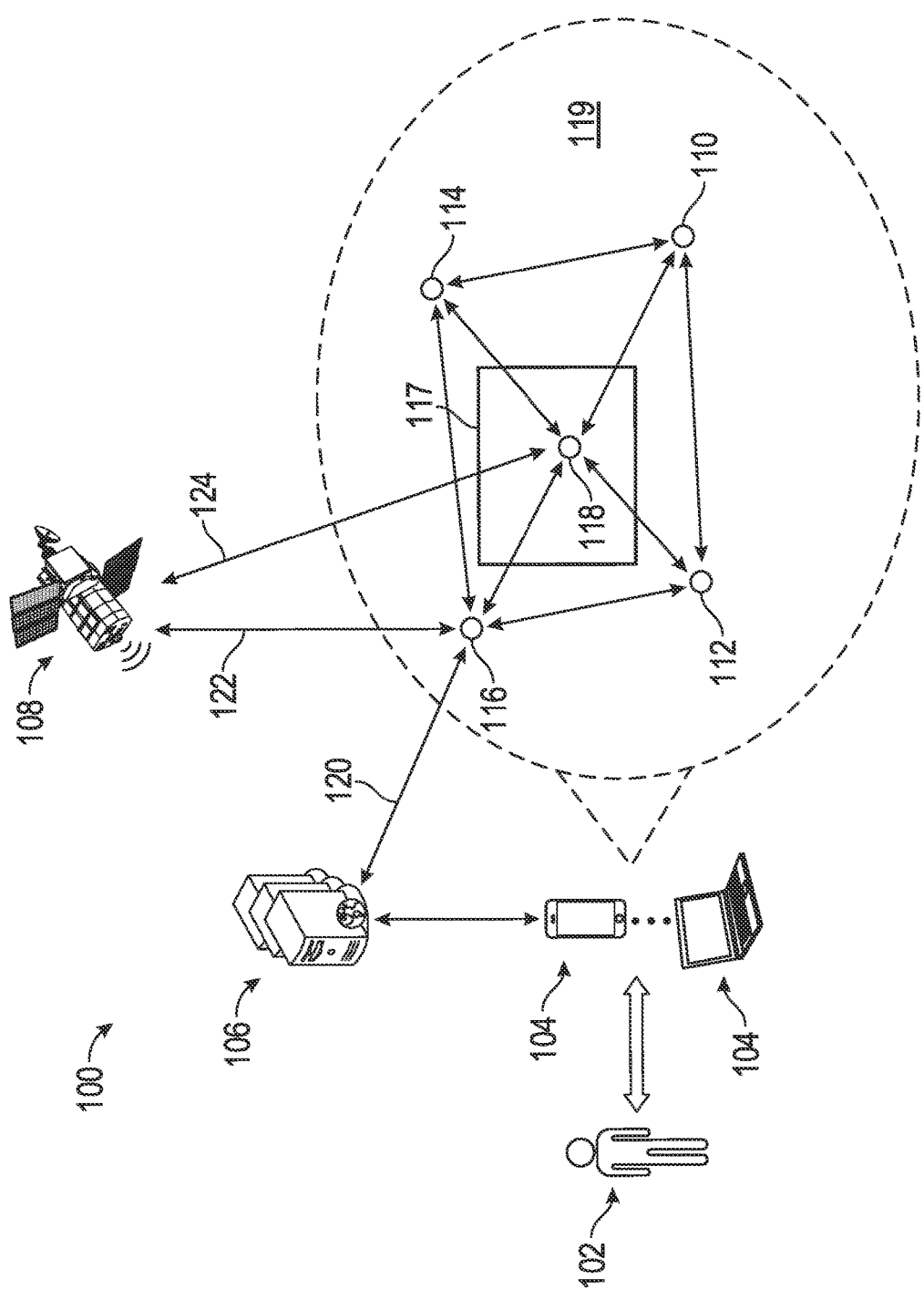
FIG. 1 depicts a schematic illustration of an example system, in accordance with one or more example embodiments of the disclosure.

Turning to the figures, FIG. 1 depicts a schematic illustration of an example system 100, in accordance with one or more example embodiments of the disclosure. The system may include one or more mobile devices 104 that may be associated with one or more users 102, a central system 106, and one or more tracking devices (for example tracking device 110, tracking device 112, tracking device 114, tracking device 116, tracking device 118, and/or any other number of tracking devices).

In some embodiments, the one or more tracking devices may exist in an environment 119, and may be separated by any amount of distance. Some or all of the tracking devices may be associated with other objects, such as one or more vehicles. However, the tracking devices may be standalone tracking devices as well. Some of the tracking devices may be located outdoors and may be able to send long distance signals. For example, tracking device 110, tracking device 112, tracking device 114, and tracking device 116 may be capable of sending long-range communication 120 to the central system 106. In some cases, the long-range communication 120 may be a LoRaWAN signal, and the central system 106 may be a LoRaWAN gateway. However, the long-range communication 120 may be any other type of signal transmitted using any other type of communication protocol. Additionally, the central system 106 may be any other type of system as well. Any of the tracking devices may be capable of being tracked using GPS signals, such as GPS signal 122 and GPS signal 124.

In some embodiments, some or all of the tracking devices may also be capable of communicating using short-range signals, such as short-range signal 130, short-range signal 132, short-range signal, 134, and/or any other number of short-range signals. For example, the short-range signal may include Bluetooth communications, or any other type of signal. In this manner, the tracking devices may form a mesh network of devices that may share information, such that the tracking devices may have information about other neighboring tracking devices in the mesh network. In some cases, some of the tracking devices (for example, tracking device 118) may be temporarily or permanently incapable of transmitting long-range signals or being tracked using GPS tracking. For example, the tracking device 118 may be located indoors, and thus may be incapable of performing long-range signals or being tracked using GPS tracking (as indicated by the GPS signal 124 including an "x"). However, the use of the short-range signals may still allow information about such tracking devices to be shared among other tracking devices in the mesh network, as well as the central system 106. To ensure accurate information is provided, the tracking devices may be synchronized to wake-up during particular time periods to transmit and/or listen for data from other tracking devices in the mesh network. These wake-up periods may be time synchronized to a high degree of accuracy using GPS synchronization. In some cases, the central system 106 may be responsible for managing the time synchronization, however, the time synchronization may be managed in any other manner as well.

In some embodiments, a topology mapping of the location of the different tracking devices may be presented to the one or more users 102 (for example, through a user interface of a mobile device 104). Additional information about the presentation of this information, as well as the functionality associated with any of the elements of the system 100 may be described in further detail above, as well as in association with the system 200 of FIG. 2 as well.

FIG. 2 depicts an example use case 200, in accordance with one or more example embodiments of the disclosure.

Specifically, the use case 200 shows an example implementation of the systems and methods described herein in which the tracking devices are associated with vehicles and are used to provide real-time updates regarding the location of any of the vehicles. For example, the vehicles may be a network of commonly-owned vehicles, such as vehicles associated with a rideshare service. As another example, the vehicles may be vehicles associated with a dealership that may include multiple locations. However, any other grouping of vehicles may also be tracked in a similar manner.

The tracking devices and associated mesh network described herein may be particularly beneficial in this use case 200 given that vehicles may constantly change location and oftentimes may operate or park within locations in which long-range communications are not available. Thus, the tracking devices and mesh network may be used to more effectively track the location of individual vehicles comprising group of vehicles regardless of these factors.

The use case 200 shows one or more vehicles (for example, vehicles 206, 208, 210, 212, and 214) that exist within an environment 202. The environment includes a road 216, a parking deck 218, and a parking lot 220. The vehicle 208 and vehicle 210 are shown as traversing the road 216. The vehicle 212 and vehicle 214 are shown as being parked within the parking lot 220. The vehicle 206 is shown as being parked in the parking deck 218. Specifically, the vehicle 206 is parked underground within the parking deck 218. The example environment 202 shown in the figure is merely intended to be illustrative and the use case 200 may also apply to any other environment as well.

The vehicles shown in the figure may each include an associated tracking device. For example, vehicle 206 my include tracking device 224, vehicle 208 may include tracking device 226, vehicle 210 may include tracking device 228, vehicle 212 may include tracking device 230, and vehicle 214 may include tracking device 232. The tracking devices may be the same as the tracking devices described with respect to FIG. 1 and/or any other tracking devices described herein. For example, any of the tracking devices may be configured to communicate with one another using short-range signals (for example, Bluetooth, NFC, and/or any other type of short-range signal described herein or otherwise). This allows a combination of tracking devices to form a "mesh network" in which the tracking devices may share information with one another such that information about the mesh network as a whole may be maintained. Reference may be made interchangeably to a tracking device or a vehicle performing a given action. However, it should be noted that either the tracking device or the vehicle could perform any of the described actions. For example, a tracking device itself may perform communications with the server 224, or the tracking device may provide information to a vehicle and the vehicle may perform the communications.

Also shown in the figure is a network 222, which may be a long-range communications network, such as a LoRaWAN network (and/or any other type of network involving long-range wireless communications). Vehicles 208, 210, 212, and 214 may be able to communicate with a server 224 using long-range communications over the network 222 (in some cases, through the tracking devices, however, this may not be required). However, the tracking device 224 of vehicle 206 may not be able to communicate over the network 222 based on the location in which it is parked.

The server 224 may be the "central system" as described herein and may maintain any information obtained from any of the tracking devices and/or vehicles. For example, the server 224 may store location (and any other information) relating to any of the tracking devices and their associated vehicles. The server 224 may also facilitate the synchronized wake-up of the tracking devices for synchronized data sharing. The server 224 may also facilitate presentation of any information to a user through a user interface. For example, the server 224 may provide information to a mobile device application of a user that may allow the user to view the stored information about the tracking devices and/or the vehicles (such as a real-time map showing the locations of the tracking devices and/or vehicles, as one non-limiting example). The server 224 may actually comprise multiple servers. Furthermore, in some instances, a decentralized ledger may be used instead of a centralized server 224. For example, each tracking device and/or vehicle may maintain a shared ledger that is associated with a blockchain.

The use case 200 illustrates how the mobility of the vehicles (for example, the vehicle 208 and 210 shown as traversing the road 216 in the figure) may be used to further enhance a mesh network as described herein to more effectively track the location of any of the vehicles, such as vehicle 206, which may otherwise not be able to communicate its location to server 224 over the network 222. The vehicle 206 may also not normally be in close enough proximity to another vehicle to allow the vehicle 206 to transmit location information to the other vehicle over short-range communications (which may then transmit the location information for the vehicle 206 to the server 224 over the network 222) as described herein.

This potential problem is mitigated within this use case 200 by relying on vehicles that are traversing the environment 202 (for example, vehicle 208 and vehicle 210) to "discover" any vehicles that are unable to communicate location information to the server 224. That is, for a given period of time as the vehicle 208 is driving along the road 216, the tracking device 226 of the vehicle 208 may be sufficiently proximate to the tracking device 224 of vehicle 206 that the tracking device 226 and the tracking device 224 may communicate using short-range wireless communications. This may allow the tracking device 226 to obtain location information from the tracking device 224 over the short-range communications, and then relay this information to the server 224 over the network 222.

Given that some of the tracking in the use case 200 is performed by vehicles in motion, the amount of time that a vehicle may be in close enough proximity to another vehicle to obtain that vehicle's location information may be limited. For example, the possibility my exist that the vehicle 208 travels past the parking deck 218 and the vehicle 206 during a time period in which the tracking device 224 of vehicle 206 and/or the tracking device 226 of vehicle 208 are not transmitting and/or receiving data. This may occur for any number of different reasons. For example, the tracking devices may be configured to operate in a low power "sleep" mode during which data transmissions may not be performed to prolong the battery life of the tracking devices. However, the tracking device 226 of the vehicle 208 may be unable to communicate with the tracking device 224 of the vehicle 206 even using short-range communications for any number of other reasons as well.

To mitigate occurrences such as this, the times at which the tracking devices within the mesh network are transmitting and/or receiving data may need to be precisely synchronized. This level of precision in time synchronization may be provided by using GPS time synchronization for the tracking devices, for example. In some cases, this synchronization information may be managed by the server 224. For example, if the long-range signals used in the network are LoRaWAN signals, then a LoRaWAN gateway may be responsible for providing time synchronization information to the devices. Using the server 224 rather than relying on individual devices to perform their own synchronization may be beneficial because the LoRaWAN gateway may be positioned such that it always receives GPS information, and so the potential for a device to lose synchronization by moving indoors may be mitigated. This synchronization information may be transmitted by the LoRaWAN gateway to devices that are currently capable of transmitting and/or receiving long-range signals (for example, devices located outdoors), and these devices may then transmit this synchronization information to the devices that are unable to transmit and/or receive long-range signals by providing this information using short-range signals.

However, there my be scenarios where an individual tracking device may maintain its own internal timer to determine any wake-up periods. For example, if a first tracking device is unable to communicate with the server 224 using the network 222, then the first tracking device may be unable to receive GPS synchronization information from the server 224. While the first tracking device may be able to indirectly receive such synchronization information from a second tracking device proximate to the first tracking device, there may be a scenario where no other tracking device is proximate to the first tracking device. In such cases, the first tracking device may maintain its own internal timer for waking up based on prior known synchronization information. Once the first tracking device is able to communicate again with the server 224 over the network 222, then the first tracking device may begin to receive synchronization information from the server 224 instead of relying on its own internal wake-up intervals.

The use of the tracking devices on vehicles as shown this use case 200 may provide benefits beyond discovering tracking devices (for example, tracking device 224) that area unable to communicate with the server 224 directly over the network 222. For example, if location updates have not been received from a first tracking device associated with a vehicle for an extended period of time, a vehicle including a second device may be routed to the last-known location of the first tracking device in an attempt to discover the location of the first tracking device using the short-range communications.

As another example, the opposite scenario that is described in the use case 200 may be applicable. That is, the tracking device 228 of the vehicle 210 may be the tracking device that is unable to communicate with the network 222. As the vehicle 210 passes the parking lot 220, the vehicle 230 and/or the vehicle 232 may exchange information with the vehicle 210 using short-range signals. The vehicle 230 and/or the vehicle 232 may then communicate this information to the server 224 over the network 222.

As a third example, the mobility provided to the tracking devices through the vehicles may simply be used to provide more effective information sharing within the mesh network. For example, the mobility of the vehicles makes it more likely that any of the tracking devices have the possibility to travel to any of the other tracking devices. In this manner, more information sharing between the tracking devices is possible through the short-range signals as the tracking devices have a higher likelihood of sharing information with more tracking devices in the mesh network than if the tracking devices were fixed in location. Any other number of benefits may also be applicable as well.

Figure 3:
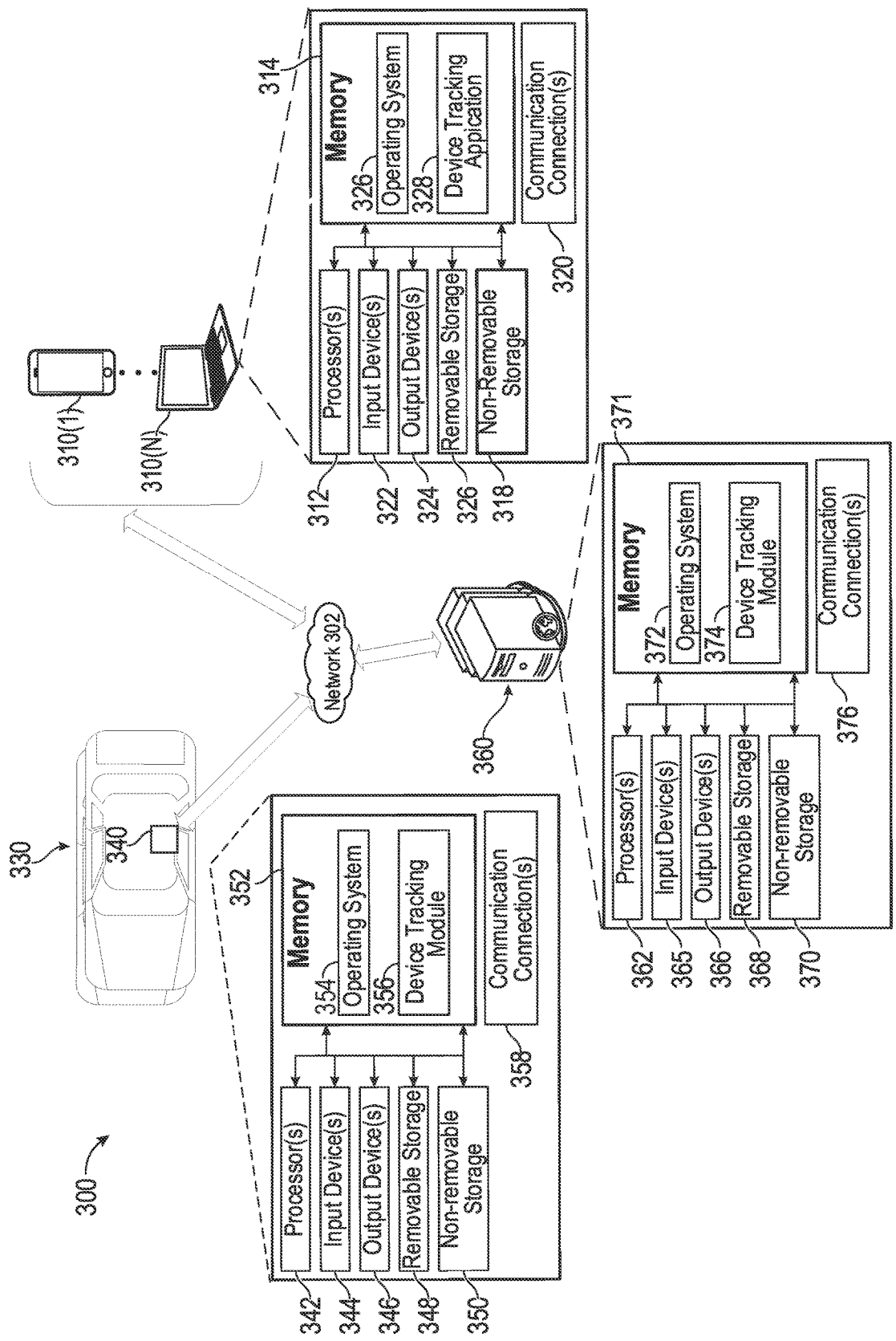
FIG. 3 depicts a schematic illustration of an example system, in accordance with one or more example embodiments of the disclosure.

FIG. 3 is a schematic illustration of example system 300 in accordance with one or more example embodiments of the disclosure. As shown in FIG. 3, the system 300 may include at least one or more mobile devices 310(1), . . . , 310(N), one or vehicles 330, which may be associated with one or more tracking device(s) 340, and one or more servers 360. In some cases, the one or vehicles 330 may be positioned in different geographical locations separated by any amount of distance.

In some embodiments, communications between a mobile device 310, tracking device 340, and/or server 360 may be performed via one or more networks 302, which may be wireless or wired networks. The one or more networks 302 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the one or more networks may have any suitable communication range associated therewith and may include, for example, global networks (e.g., the Internet), metropolitan area networks (MANs), wide area networks (WANs), local area networks (LANs), or personal area networks (PANs). In addition, the one or more networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In some embodiments, the one or more mobile devices 310(1), . . . , 310(N) may include portable or non-portable devices, each having computing resources and communication resources that permit sending, receiving, or exchanging data and/or signaling wirelessly with an external electronic device (mobile or otherwise). For instance, the mobile devices can include a mobile telephone (such as a smartphone), a tablet computer, a wearable, a laptop computer, a gaming console, an electronic reader (e-reader), a consumer electronics device having wireless communication functionality, a home appliance having wireless communication functionality, a combination thereof, or similar.

In an illustrative configuration, a mobile device 310 may include at least a memory 314 and one or more processing units (or processors) 312. The processors 312 may be implemented as appropriate in hardware, software, firmware, or combinations thereof. Software or firmware implementations of the processors 312 may include computer-executable or machine-executable instructions written in any suitable programming language to perform the various functions described.

The memory 314 may store program instructions that are loadable and executable on the processors 312, as well as data generated during the execution of these programs. Depending on the configuration and type of the device, the memory 314 may be volatile (such as random access memory (RAM)) and/or non-volatile (such as read-only memory (ROM), flash memory, etc.). The device 310 or server may also include additional removable storage 316 and/or non-removable storage 318 including, but not limited to, magnetic storage, optical disks, and/or tape storage. The disk drives and their associated computer-readable media may provide non-volatile storage of computer-readable instructions, data structures, program modules, and other data for the vehicles. In some implementations, the memory 314 may include multiple different types of memory, such as static random access memory (SRAM), dynamic random access memory (DRAM), or ROM.

The memory 314, the removable storage 316, and the non-removable storage 318 may be all examples of computer-readable storage media. For example, computer-readable storage media may include volatile and non-volatile, removable and non-removable media implemented in any method or technology for the storage of information such as computer-readable instructions, data structures, program modules, or other data. The memory 314, the removable storage 316, and the non-removable storage 318 may be all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the mobile device 310. Combinations of any of the above should also be included within the scope of computer-readable media. Alternatively, computer-readable communication media may include computer-readable instructions, program modules, or other data transmitted within a data signal, such as a carrier wave, or other transmissions. However, as used herein, computer-readable storage media does not include computer-readable communication media.

The mobile device 310 may also contain communication connection(s) 320 that allows the mobile device 310 to communicate with a stored database, another vehicle or server, user terminals, and/or other devices on a network. The device 310 may also include input device(s) 322 such and output device(s) 324, such as a touch screen that is capable of receiving input commands from a user and presenting a user interface to the user.

Turning to the contents of the memory 314 in more detail, the memory 314 may include an operating system 326 and one or more application programs or services for implementing the features disclosed herein, including a device tracking application 328. The device tracking application 328 may allow a user to perform certain functions using the mobile device 310. For example, the device tracking application 328 may allow a user to view the location of different tracking devices 340 (as one non-limiting example). The device tracking application 328 may also allow a user to perform any other functions. For example, a user may be able to view information obtained from the tracking devices 340 in the mesh network, which may be compiled and presented to a user through a user interface. For example, a topology including the location of some or all of the devices in the network may be mapped and presented to the user to allow the user to track the location of the tracking devices 340 in real-time. Additional information may also be presented to the user, such as identifying information associated with each of the devices, whether a tracking device 340 is trackable using GPS, information about a vehicle associated with a device (in the example use-case in which the devices are associated with vehicles) or any other types of information. A user may also be able to interact with the information presented on the user interface, For example, the tracking devices 340 may be represented as dots (or other symbols) on a map presented on the user interface, and a user may select a particular dot on the user interface to view additional information about the device being represented by the particular dot (an example may be illustrated in FIG. 1). This is just one non-limiting example of a user interface that may be presented to a user, and information about the tracking devices 340 may similarly be presented in any other manner.

Referring now to other illustrative components depicted in FIG. 3, a tracking device 340 may be configured to communicate with the mobile device 310 and/or server 360 and may be configured to perform any of the operations described herein. For example, the tracking device 340 may be associated with one or more vehicles 330, may capture information about the one or more vehicles 330, and may transmit this information to the mobile device 310 and/or the server 360, as well as other tracking devices 340. The tracking device 340 may be, for example, an OBD device that may plug into an OBD port of the vehicle. However, the tracking device may exist in any other form as well.

In some embodiments, the tracking device 340 may include some similar elements as the mobile device 310. That is, the tracking device 340 may include at least a memory 352 and one or more processing units (or processors) 342. The processors 342 may be implemented as appropriate in hardware, software, firmware, or combinations thereof. Software or firmware implementations of the processors 342 may include computer-executable or machine-executable instructions written in any suitable programming language to perform the various functions described.

The memory 352 may store program instructions that are loadable and executable on the processors 342, as well as data generated during the execution of these programs. Depending on the configuration and type of the tracking device 340, the memory 352 may be volatile (such as random access memory (RAM)) and/or non-volatile (such as read-only memory (ROM), flash memory, etc.). The tracking device 340 may also include additional removable storage 348 and/or non-removable storage 350 including, but not limited to, magnetic storage, optical disks, and/or tape storage. The disk drives and their associated computer-readable media may provide non-volatile storage of computer-readable instructions, data structures, program modules, and other data for the vehicles. In some implementations, the memory 354 may include multiple different types of memory, such as static random access memory (SRAM), dynamic random access memory (DRAM), or ROM.

The memory 352, the removable storage 348, and the non-removable storage 350 may be all examples of computer-readable storage media. For example, computer-readable storage media may include volatile and non-volatile, removable and non-removable media implemented in any method or technology for the storage of information such as computer-readable instructions, data structures, program modules, or other data. The memory 352, the removable storage 348, and the non-removable storage 350 may be all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the tracking device 340. Combinations of any of the above should also be included within the scope of computer-readable media. Alternatively, computer-readable communication media may include computer-readable instructions, program modules, or other data transmitted within a data signal, such as a carrier wave, or other transmissions. However, as used herein, computer-readable storage media does not include computer-readable communication media.

The tracking device 340 may also contain communication connection(s) 358 that may allow the tracking device 340 to communicate with a stored database, another vehicle or server, user terminals, and/or other devices on a network. The tracking device 340 may also include input device(s) 344 such as a keyboard, a mouse, a pen, a voice input device, a touch input device, etc., and output device(s) 346, such as a display, speakers, printers, etc. Additionally, the tracking device 340 may also include one or more batteries, one or more antennas, one or more magnetic switches for use in waking up the tank level monitoring device, and/or any type of sensor.

Turning to the contents of the memory 352 in more detail, the memory 352 may include an operating system 354 and one or more application programs or services for implementing the features disclosed herein, including a device tracking module 356. In some instances, the device tracking module 356 may be configured to perform operations such as capturing information from a vehicle 330, sharing location information, etc. (to name a few non-limiting examples). The device tracking module 356 may also be configured to perform any other functions described herein.

In some embodiments, the server 360 may also have similar components as the mobile device 310 and/or the tracking device 340, including at least one or more processors 362, inputs devices 365, output devices 366, removable storage 368, non-removable storage 370, communication connections 376, and memory 371, the memory including one or more operating systems 372. The server 360 may be configured to perform any of the operations described herein. For example, the server 360 may host the software platform that may be used to implement the predictive algorithm (as one non-limiting example). However, the software platform may also perform operations on a tracking device 340 or a mobile device 310 as well. Additionally, it should be noted that while the tracking device 340, mobile device 310, and server 360 may be described as performing different types of example functions, some or all of these components in the system 300 may be capable of performing the same types of functions.

Figure 4:
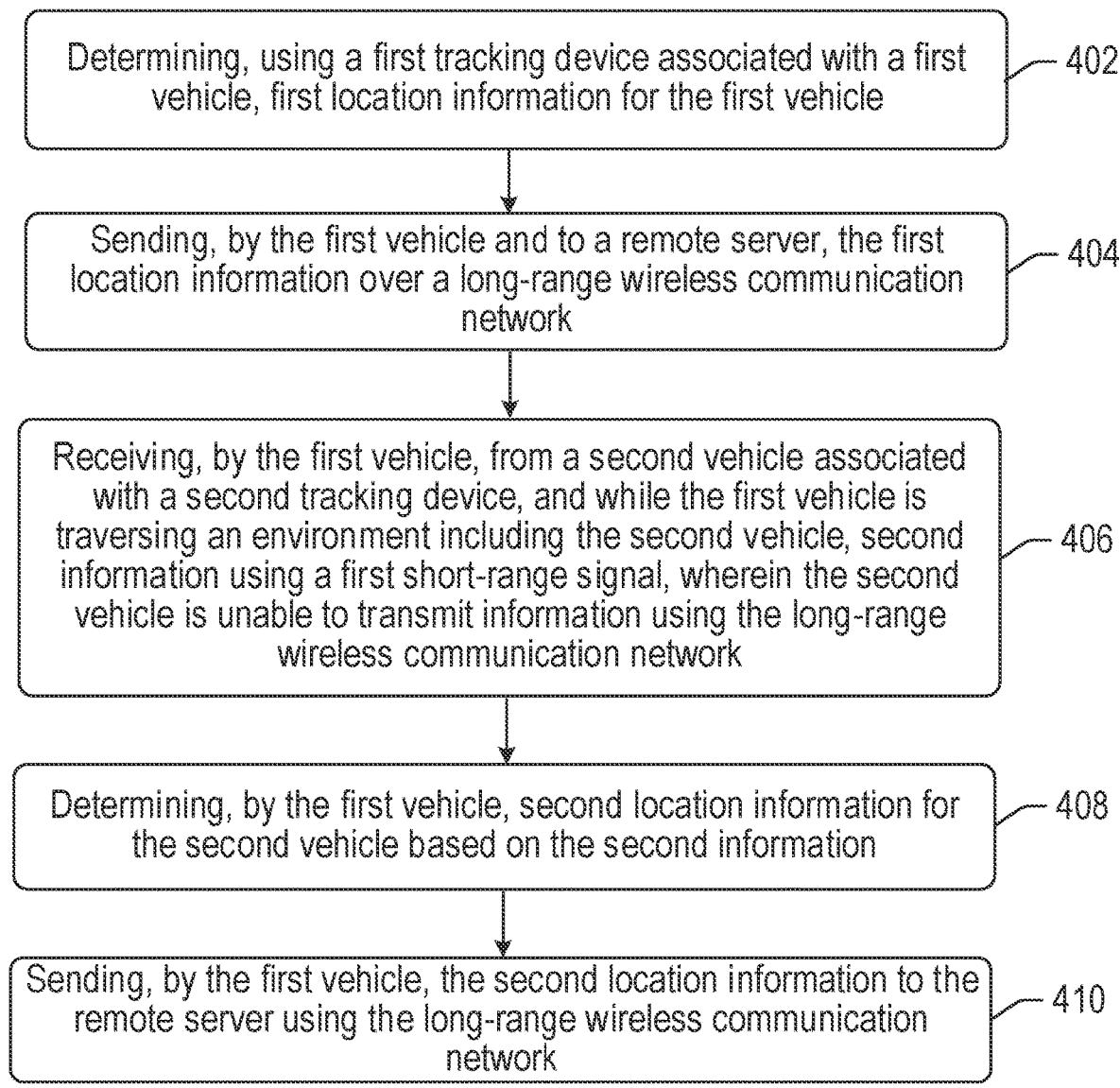
FIG. 4 depicts a schematic illustration of an example method, in accordance with one or more example embodiments of the disclosure.

FIG. 4 depicts an example method 400. The method 400 may be implemented, for example, by the one or more mobile devices 310(1), . . . , 310(N), one or vehicles 330, one or more tracking device(s) 340, one or more servers 360, and/or any other system, device, etc. described herein. At block 402 of the method 400 in FIG. 4, the method may include determining, using a first tracking device associated with a first vehicle, first location information for the first vehicle. Block 404 of the method 400 may include sending, by the first vehicle and to a remote server, the first location information over a long-range wireless communication network. Block 406 of the method 400 may include receiving, by the first vehicle, from a second vehicle associated with a second tracking device, and while the first vehicle is traversing an environment including the second vehicle, second information using a first short-range signal, wherein the second vehicle is unable to transmit information using the long-range wireless communication network. Block 408 of the method 400 my include determining, by the first vehicle, second location information for the second vehicle based on the second information. Block 410 of the method 400 may include sending, by the first vehicle, the second location information to the remote server using the long-range wireless communication network.

In some embodiments, the method 400 may further include sending the first location information and the third location information to a central system using a long-range signal. In some embodiments, the short-range signal is a Bluetooth signal and wherein the long-range signal is a LoRaWAN signal. In some embodiments, the first location information and the second location information includes Global Positioning System (GPS) location information. In some embodiments, determining the third location information is based on an received signal strength indicator (RSSI) of the second short-range signal or a maximum range of the second short-range signal. In some embodiments, determining that the second location information fails to meet the threshold level of accuracy further comprises determining that less than a threshold number of satellites located the second device using one or more Global Positioning System (GPS) signals. In some embodiments, the first time interval is synchronized among the first device, second device, and third device using Global Positioning System (GPS) time synchronization.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database task or search language, or a report writing language. In one or more example embodiments, a software component comprising instructions in one of the foregoing examples of programming languages may be executed directly by an operating system or other software components without having to be first transformed into another form.

A software component may be stored as a file or other data storage construct. Software components of a similar type or functionally related may be stored together, such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines, and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
    a first vehicle including a first tracking device;
    a second vehicle including a second tracking device;
    a central system;
    one or more processors; and
    memory storing computer-executable instructions, that when executed by the one or more processors, cause the one or more processors to:
        determine, by the second vehicle, that the second vehicle is unable to transmit information using a long-range wireless communication network;
        determine, by the second vehicle and within a first time interval, first location information for the second vehicle and second location information for the second vehicle, wherein the second location information is based on a short-range signal;
        determine, by the second vehicle, that the first location information fails to meet a threshold level of accuracy;
        transmit, by the second vehicle, to the first vehicle, and based on the determination that the first location information fails to meet the threshold level of accuracy, the second location information instead of the first location information; and
        send, by the first vehicle, the second location information to the central system using the long-range wireless communication network.

2. The system of claim 1, wherein the short-range signal is a Bluetooth signal and wherein the long-range wireless communication network is a LoRaWAN network.

3. The system of claim 1, wherein the first tracking device and second tracking device are synchronized to send or receive data at a predetermined time interval using Global Positioning System (GPS) time synchronization.

4. The system of claim 1, wherein the first location information is Global Positioning System (GPS) location information.

5. The system of claim 1, wherein the second location information is based on a received signal strength indicator (RSSI) of the short-range signal or a maximum range of the short-range signal.

6. The system of claim 1, wherein the determination that the first location information fails to meet the threshold level of accuracy is based on a determination that less than a threshold number of satellites located the second tracking device using one or more Global Positioning System (GPS) signals.

7. A system comprising:
    one or more processors; and
    memory storing computer-executable instructions, that when executed by the one or more processors, cause the one or more processors to:
        receive, during a first time interval, by a first tracking device associated with a first vehicle, and from a second tracking device associated with a second vehicle, a first short-range signal including first location information associated with the second tracking device;
        receive, during the first time interval, by the first tracking device, and from a third tracking device associated with a third vehicle, a second short-range signal including second location information associated with the third tracking device;
        receive an indication the first location information meets a threshold level of accuracy;
        receive an indication that the second location information fails to meet the threshold level of accuracy; and
        determine, based on the indication that the second location information fails to meet the threshold level of accuracy, third location information associated with the second tracking device during the first time interval, the third location information being based on the second short-range signal.

8. The system of claim 7, wherein the computer-executable instructions further cause the one or more processors to:
    send the first location information and the third location information to a central system over a long-range wireless communication network.

9. The system of claim 8, wherein the first short-range signal is a Bluetooth signal and wherein the long-range wireless communication network is a LoRaWAN network.

10. The system of claim 7, wherein the first location information and the second location information includes Global Positioning System (GPS) location information.

11. The system of claim 7, wherein determining the third location information is based on a received signal strength indicator (RSSI) of the second short-range signal or a maximum range of the second short-range signal.

12. The system of claim 7, wherein the determination that the second location information fails to meet the threshold level of accuracy is based on a determination that less than a threshold number of satellites located the second tracking device using one or more Global Positioning System (GPS) signals.

13. The system of claim 7, wherein the first time interval is synchronized among the first tracking device, second tracking device, and third tracking device using Global Positioning System (GPS) time synchronization.

14. A method comprising:
receiving, over a long-range wireless communication network, by a central system, and from a first vehicle including a first tracking device, first location information and second location information for the first vehicle, wherein the second location information is based on a short-range signal;
determining, by the central system, that the first location information satisfies a threshold level of accuracy;
determining, by the central system and based on the determination that the first location information satisfies the threshold level of accuracy, a location of the first vehicle using the first location information;
receiving, over the long-range wireless communication network, by the central system, and from the first vehicle, third location information and fourth location information for a second vehicle including a second tracking device, wherein the second vehicle is at least temporarily unable to transmit information using the long-range wireless communication network;
determining, by the central system, that the third location information fails to satisfy a threshold level of accuracy; and
determining, by the central system and based on the determination that the third location information fails to satisfy the threshold level of accuracy, a location of the second vehicle using the fourth location information instead of the third location information.

15. The method of claim 14, wherein short-range signal is a Bluetooth signal and wherein the long-range wireless communication network is a LoRaWAN network.

16. The method of claim 14, wherein the first tracking device and second tracking device are synchronized to send or receive data at a predetermined time interval using Global Positioning System (GPS) time synchronization.

17. The method of claim 14, wherein the first location information and the third location information includes Global Positioning System (GPS) location information.

18. The method of claim 14, wherein the second location information and the fourth location information are based on a received signal strength indicator (RSSI) of the short-range signal or a maximum range of the short-range signal.

* * * * *